United States Patent [19]

Kleinsasser et al.

[11] Patent Number: 4,660,508
[45] Date of Patent: Apr. 28, 1987

[54] COMBINATION WET AND DRY FEEDER FOR ANIMALS

[76] Inventors: Jonathan R. Kleinsasser; Dan Kleinsasser, both of General Delivery, Ste. Agathe, Manitoba, Canada, R0G 1Y0

[21] Appl. No.: 829,301
[22] Filed: Feb. 14, 1986

[30] Foreign Application Priority Data

Jun. 10, 1985 [CA] Canada ................................ 483602

[51] Int. Cl.4 ............................ A01K 5/02; A01K 7/06
[52] U.S. Cl. .................................. 119/51.5; 119/53.5; 119/54
[58] Field of Search ................. 119/51.5, 53, 18, 53.5, 119/54

[56] References Cited

U.S. PATENT DOCUMENTS

| | | | |
|---|---|---|---|
| 1,061,710 | 5/1913 | Webb | 119/53 |
| 1,148,301 | 7/1915 | Enos, Jr. | 119/53 |
| 3,269,358 | 8/1966 | Hawley | 119/18 X |
| 4,377,130 | 3/1983 | Schwieger | 119/51.5 |
| 4,481,907 | 11/1984 | Blicher | 119/51.5 X |

FOREIGN PATENT DOCUMENTS 2843153  4/1979  Fed. Rep. of Germany ..... 119/51.5

Primary Examiner—Hugh R. Chamblee
Attorney, Agent, or Firm—Adrian D. Battison; Stanley G. Ade

[57] ABSTRACT

A feeder unit for animals, particularly pigs, provides feed in either wet or dry condition and comprises a trough and a shelf positioned above the trough with a water supply duct beneath the shelf for directing water through valves actuated by the pig into the trough. A hopper positioned above the shelf directs material continuously onto the shelf to be retained on the shelf by the repose angle. The pig can this either eat directly from the shelf the feed in dry condition or can brush the feed into the trough for mixing with water and eating in wet condition.

12 Claims, 3 Drawing Figures .

COMBINATION WET AND DRY FEEDER FOR ANIMALS

BACKGROUND OF THE INVENTION

This invention relates to a combination wet and dry feeder for animals which is particularly suitable for pigs.

Pigs are generally fed dry feed in a trough and are separately supplied with water which they can drink. They have a significant amount of intelligence which enables them to actuate water nipples and feed dispensers and such arrangements have been proposed of various different types. In recent years there have been a number of proposals and products on the market for wet feeders in which the water nipples are arranged in a single trough into which the feed is deposited in many cases using levers actuated by the pigs.

The intention is, of course, in an intensive farming situation to organize and supply the pigs so that they eat as much and as quickly as possible so as to reach the required weight and be shipped to market within the shortest possible time. To this end it is desirable to supply the pigs with feed in whatever condition they desire so that they take as much as they can without in any way being inhibited from eating further. Furthermore it is best if the feed is taken in a dry condition with the pig drinking as little water as possible since of course the water tends to fill the pig and reduce the amount that it wishes to eat.

SUMMARY OF THE INVENTION

Accordingly, it is one object the present invention, to provide a feeder for animls and particularly pigs which allows the supply of feed in wet or in dry condition.

It is a further object of the present invention to provide a combination wet or dry feeder which is manufactured with a minimum number of moving parts so as to be inexpensive in its construction and simple to maintain.

According to the invention, therefore, there is provided a feeder unit for animals comprising a trough having a base and a sidewall for receiving and containing feed and water and arranged such that the head of the animal can reach over an upper front edge of the sidewall to the base for eating the feed and water, a shelf providing a substantially horizontal surface for receiving feed, said shelf being arranged above said trough and rearwardly of said front edge so as to allow access by the head of the animal to said shelf and between said shelf and said front edge to said base, means for depositing feed onto said shelf arranged such that deposited feed on the shelf remains on said shelf but can be removed to the trough by the animal, and means for dispensing water into the trough arranged such that it avoids dispensing water onto the shelf and including means actuable by the animal for controlling the dispensing.

Preferably the water dispenser is arranged directly beneath the shelf and directed downwardly so as to direct the water into the trough in a manner which prevents or is not intended to allow the pig to drink directly from it so the water is deposited into any feed in the trough.

The above arrangement allows the pig either to choose wet feed or dry feed depending upon its preference so that the pig can eat directly from the shelf taking dry feed or if preferred can deposit the feed into the trough and add water to it and take it in a wet form.

Preferably the feed material is deposited directly onto the shelf from a hopper with the control of the amount of the feed material being obtained by the positioning of a lowermost edge of the hopper or a chute from that hopper relative to the shelf so that the repose angle of the feed itself causes the deposit of feed to halt when the shelf is filled. In order to accommodate different flow characteristics of different feed materials, the height of the lower edge of the hopper or the hopper duct relative to the shelf can be adjusted to achieve the proper repose angle which provides a slope of the feed material which terminates just short of the edge of the shelf.

The shelf can be formed from a sheet material which is a slight lip along an edge adjacent the edge of the trough to assist in retaining the feed on the shelf and also a downturn flange forming a V-shaped edge which the pig can grasp with its mouth while scooping material from the top of the shelf.

With the foregoing in view, and other advantages as will become apparent in those skilled in the art to which this invention relates as this specification proceeds, the invention is herein described by reference to the accompanying drawings forming a part hereof, which includes a description of the best moded known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
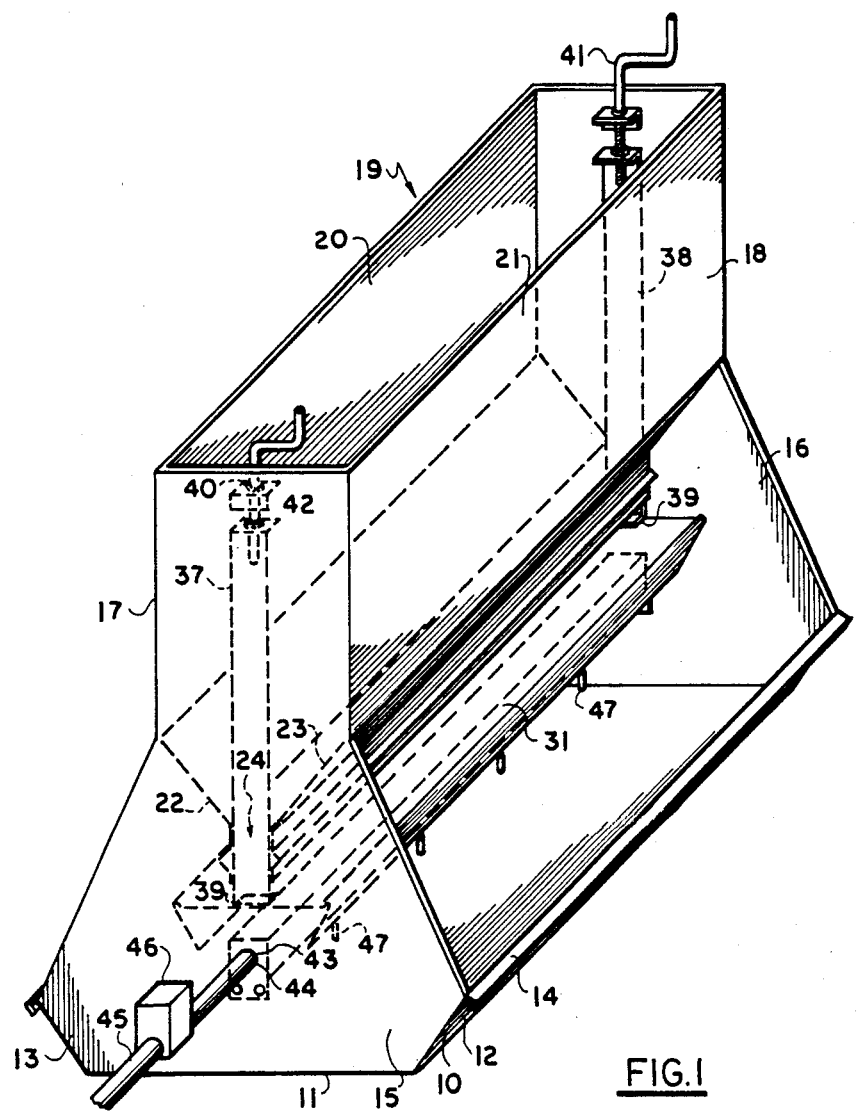
FIG. 1 is an isometric view of a feeder unit according to the invention.
Figure 2:
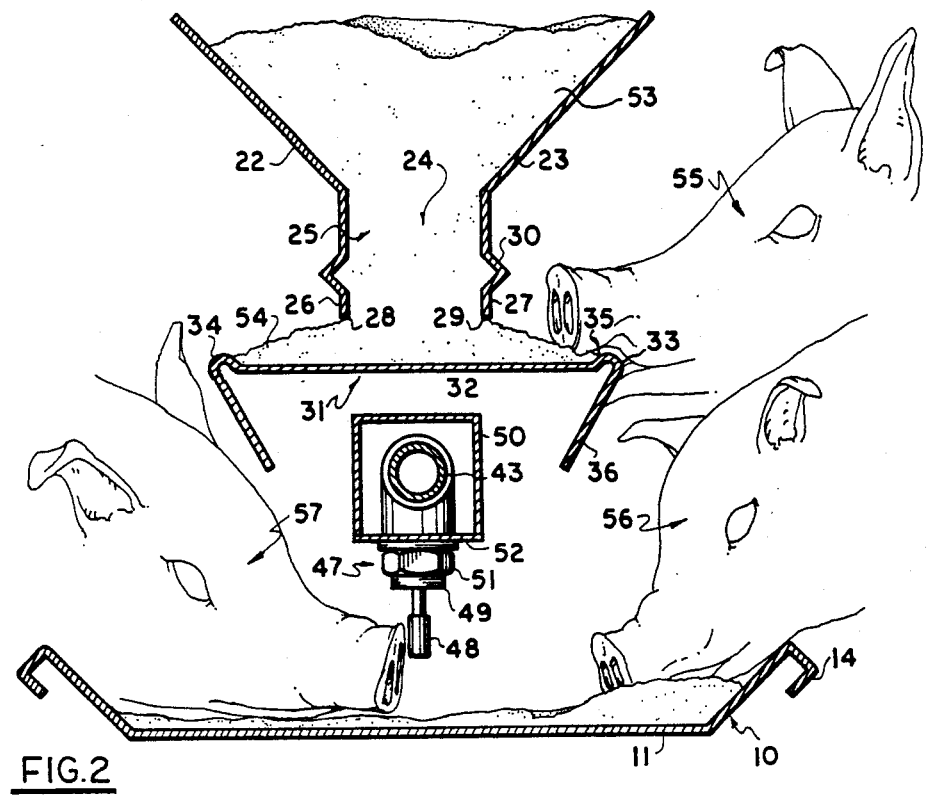
FIG. 2 is a cross sectional view of the feeder unit of FIG. 1.

Turning firstly to FIGS. 1 and 2, the feeder unit comprises a trough 10 which has a base 11 for resting on the floor of an animal pen and a pair of sidewalls 12, 13 which are inclined upwardly and outwardly so that the trough defines a receptacle for water and feed. An upper edge 14 of the sidewalls 12, 13 is turned over so as to avoid the presentation of a raw edge to the animal and also to provide strength so the walls 12 and 13 are more difficult to deform.

The trough carries a pair of end panels 15, 16 which close the ends of the trough and also extend upwardly and inwardly to a rectangular end panel section 17, 18 defining the ends of a hopper 19. In between the end panels 15 and 16 is an open area on either side of the trough through which the pig can reach for taking feed and water from the base 11 of the trough as shown in FIG. 2.

The hopper 19 comprises the end walls 17 and 18 together with parallel sidewalls 20 and 21 which are connected to the end walls to form a rectangular hopper. A base of the hopper is formed by downwardly and inwardly converging base walls 22, 23 defining an elongate opening 24 longitudinally of the hopper 19. A chute 25 depends downwardly from the opening 24 and is defined by sidewalls 26 and 27 which terminate at longitudinal edges 28, 29 along the full length of the hopper. The sidewalls 26, 27 of the chute can be deformed as indicated at 30 to provide resistance against bending out of the parallel. The ends of the walls 22, 23, 26, 27 are welded to the end plates 15 and 16 so as to close the hopper and hopper base and ensure that all material fed into the hopper falls gradually through the lower end of the chute 25.

A shelf 31 is mounted beneath the chute 25 and comprises a substantially flat horizontal plate 32 with parallel edges 33, 34 extending longitudinally thereof and spaced outwardly of the chute 25. At each of the edges, the plate 32 is turned slightly upwardly at 35 to form a slight dish structure and then a flange 36 is formed by turning the edge of the plate 32 downwardly to form a V-shape inverted to present the base of the V forwardly at the edge of the shelf 31.

The shelf is attached at each end to a strap 37, 38 by way of right angle bracket portion 39. The straps 37, 38 are freely slideable at the end plates 17, 18 upwardly and downwardly under control of respective screws 40, 41 which co-operate with right angle brackets 42 rigidly attached to the respective end plate 17, 18. Thus, actuation of the screws 40, 41 causes vertical movement of the shelf 31 to adjust the spacing between the lowermost edge 28, 29 of the chute 25 and the plate 32.

A water supply duct 43 passes through a circular opening 44 in one of the end plates 17 and extends longitudinally of the shelf a short distance beneath the shelf. The supply duct 43 receives water from a supply schematically indicated at 45 through a timer valve schematically indicated at 46 which controls the supply of water to the duct 43. The duct carriers a plurality of valves 47 each of which includes an actuation rod 48 which projects downwardly from an open end of a "T" fitting 49. The actuation rod 48 is coupled to a flat valve within the "T" fitting which is spring biased into a closed position but can be opened by pushing the valve rod 48 to one side so that water escapes from the "T" fitting 49 over the valve rod 48 into the trough 10. The valve rod 48 can be simply actuated by a pigs snout but the water is intended not to be drunk as it descends from the supply but to fall directly into the trough for drinking from the trough. The supply duct 43 is mounted within an inverted U channel 50 for protection and carries a plurality of the "T" fittings 49 each of which is screw threaded for attachment by an nut 51 to a plate 52 welded across the open end of the channel 50 at spaced locations. The details of the valve 47 are well known in the art and commercially available.

As best illustrated in FIG. 2, in operation, feed is deposited into the hopper and indicated at 53. The feed falls continuously and unencumbered onto the shelf 31 and particularly the plate 32 to flow outwardly toward the edge of the shelf 31 as indicated at 54. The distance between the edges 28, 29 and the plate 32 is chosen such that the repose angle of the feed causes the outflow to terminate at a position adjacent the edge of the shelf without flowing directly over the edge of the shelf into the trough 10. Thus the feed will continuously and automatically take up a position shown in FIG. 2 and any feed removed from the shelf will cause further feed to fall onto the shelf and take up the repose angle indicated at 54.

The distance between the edges 28, 29 and the shelf can be adjusted by operation of the screws 40, 41 to accommodate different flow characteristics of different feeds.

When the feed is positioned on the shelf, it can be taken directly by a pig as indicated at 55 by the pig opening its mouth and placing its top jaw onto the top of the shelf 31 and its lower jaw against the flange 36 thus withdrawing dry feed directly into the mouth of the pig.

If the pig prefers it can use its snout to brush feed from the shelf over the edge 33 into the trough 10 for eating from the trough as shown at 56. Water will normally be present in the trough 10 for drinking and thus the feed in the trough 10 will generally be in a wet condition. The pig can add to the water for drinking or for applying water to the feed by actuating the rod 48 as indicated at 57. The water dispenser, as previously explained, is arranged so that the pig cannot drink water directly and hence the pig will normally be taking feed with water from the trough.

The valve 46 can be actuated periodically to shut off the water supply so that thirsty pigs clean out the trough 10 to avoid collection of stale material in the corners and over the base. The shelf 31 remains cleaned by the continuous supply of dry feed and is not contaminated with wet feed which tends to stick to the surfaces. Thus, the feeder can be maintained in a clean condition without attention merely by managing the pigs so that they properly clean up all areas.

It will be noted that the spacing between the edge 33 of the shelf and the edge 14 of the sidewall is such that the pig can reach into the area beneath the shelf and within the trough for withdrawing feed material from the trough. At the same time the pig can lift its head and feed directly from the shelf. In one example the width of the trough across the edges 14 can be of the order of twenty-four inches with the width of the shelf being of the order of six inches and the width of the chute 25 being of the order of three inches. This gives sufficient area for the pigs to reach into the trough and provide a sufficient area of shelf to retain feed while allowing the pig to simply remove feed by grasping the V-shaped shelf as shown.

In alternative arrangements (not shown) the feeder unit can be a single sided unit which is only accessable by pigs from one side so the shelf effectively only has one edge 33 and the trough effectively only has one sidewall over which the pigs can reach. In a further alternative, the feeder unit can be circular with a concentric circular shelf and a circular outer sidewall 14 for positioning centrally within a pig pen. Thus, pigs can access the feeder around the full circumference of the circular feeder as opposed to the two sides of the feeder as shown in FIGS. 1 and 2. In the alternative relating to the circular feeding unit, the water supply can be provided by a duct which extends along the axis of the feeding unit downwardly through the shelf to supply a ring of valves underneath the shelf. In this case the shelf can in fact be attached to the duct for upward and downward movement with the duct to provide the adjustment as previously explained.

Figure 3:
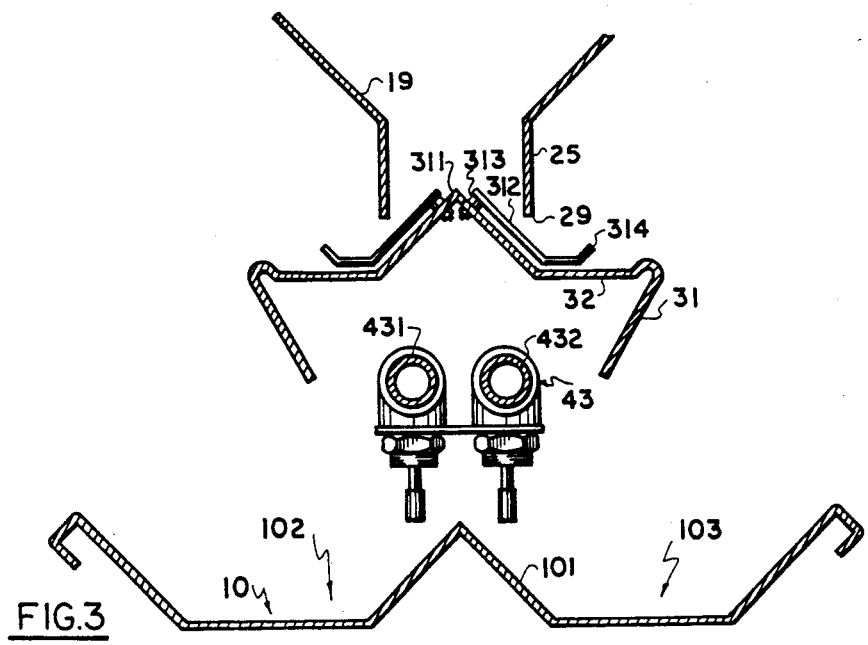
FIG. 3 is a cross sectional view of a modified feeder unit according to the invention.

Turning now to FIG. 3, there is shown in cross section a modified arrangement which includes a hopper 19 as previously described and a trough 10 together with a shelf 31. In this arrangement, however, the trough 10 is modified by the provision of an inverted V-shaped ridge 101 longitudinal of the trough and dividing it into two trough portions 102, 103. The ridge 101 is suitable to receive a base stringer of a penning fence so that the feeder can be positioned over the base stringer. In addition, the ridge 101 divides the trough into the two portions so that the feeder unit can be used from only one side if this is required any time without feed material and water collecting in the far side of the trough in a position which is inaccessable to the pigs.

In this case the water supply duct 43 is modified to provide two separate ducts 431, 432 each of which is operable to supply water into respective one of the portions 102, 103 to prevent water collecting in the other trough area when only one side is being used.

In a further modification the shelf 31 also includes a V-shaped ridge 311 which projects symmetrically into the chute 25 so the feed material can be deposited on either side of the ridge 311 and onto the shelf at either side. In case feed material becomes lodged between the lower edge 29 of the chute 25 and the plate 32, a plurality of rods can be arranged along the length of the shelf 31. The rods indicated at 312 can be pivoted at 313 about an axis at right angles to the shelf. The rods then follow the contour of the shelf and depend downwardly from the ridge 311 through the space between the edge 29 and the plate 32 and provide an upstanding portion 314 which can be grasped and actuated by the pig to work feed through the gap and onto the shelf.

The water supply duct 43 is also modified in that it can be formed from a rigid material such as stainless steel which is self supporting and self protecting and thus the channel 50 can be omitted as shown in FIG. 3.

Since various modifications can be made in my invention as hereinbelow described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A feeder unit for animals comprising an elongate trough having a base and a sidewall for receiving and containing feed and water and arranged such that the head of the animal an reach over an upper front edge of the sidewall to the base for eating the feed and water, an elongate shelf extending substantially along a full length of the trough and providing a substantially horizontal surface for receiving feed, said horizontal surface of said shelf being arranged at a height above and rearwardly of said front edge so as to allow access by the head of the animal to said shelf for direct feeding therefrom, and between said shelf and said front edge to said base, hopper means for directly and continuously depositing feed onto said shelf, said hopper means including an elongate lowermost edge, means mounting said lowermost edge and said shelf such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents feed from falling over the front edge of the shelf and thus automatically controls deposit of further feed onto said shelf, said mounting means including means for manually adjusting the vertical distance from the lowermost edge to the surface and being arranged to maintain said lowermost edge fixed against animal actuated movement, whereby deposited feed on the shelf remains on said shelf but can be removed to the trough by the animal, and means for dispensing water into the trough arranged such that it avoids dispensing water onto the shelf and including means actuable by the animal for controlling the dispensing.

2. The invention according to claim 1 wherein the dispensing means is arranged beneath the shelf and arranged to direct water downwardly therefrom into the trough.

3. The invention according to claim 1 wherein the dispensing means is arranged such that the animal is not intended to drink directly from it.

4. The invention according to claim 1 including timer means for periodically shutting off water supply to said dispensing means.

5. The invention according to claim 1 wherein the shelf includes an edge nearest to said front edge of said trough which is turned upwardly and outwardly to assist in retaining feed on said shelf.

6. The invention according to claim 1 wherein the adjusting means comprises means for supporting the shelf and screw means for moving said supporting means relative to the hopper.

7. The invention according to claim 1 wherein the trough and shelf are arranged for access by said animals from two opposed sides thereof and wherein the trough includes a ridge centrally thereof dividing said trough into two trough portions and forming a channel along an underside of the trough.

8. The invention according to claim 1 wherein the trough and shelf are arranged from access by said animals from two opposed sides thereof and wherein the trough includes a ridge centrally thereof dividing said trough into two trough portions and forming a channel along an underside of the trough including two water dispensing means each arranged to dispense into a respective trough portion.

9. The invention according to claim 1 wherein the trough and shelf are arranged for access by said animals from two opposed sides thereof and wherein the shelf includes an inverted V-shaped ridge projecting toward said depositing means, said depositing means being arranged to deposit symmetrically onto and either side of said ridge.

10. The invention according to claim 1 wherein the shelf includes a plurality of rods each pivotally mounted on the shelf about an axis upstanding therefrom and including an upturned end for grasping and pivoting movement by an animal to disturb feed between said dispensing means and said shelf.

11. A feeder unit for animals comprising an elongate trough having a base and a sidewall for receiving and containing feed and water and arranged such that the head of the animal can reach over an upper front edge of the sidewall to the base for eating the feed and water, an elongate shelf extending substantially along a full length of the trough and providing a substantially horizontal surface for receiving feed, said horizontal surface of said shelf being arranged at a height above and rearwardly of said front edge so as to allow access by the head of the animal to said shelf for direct feeding therefrom, and between said shelf and said front edge to said base, hopper means for directly and continuously depositing feed onto said shelf, said hopper means including an elongate lowermost edge, means mounting said lowermost edge and said shelf such that the lowermost edge extends substantially wholly along, adjacent to and spaced from said horizontal surface by a vertical distance and spaced from a front edge of the shelf by a horizontal distance such that the angle of repose of the feed from the lowermost edge to said shelf prevents feed from falling over the front edge of the shelf and thus automatically controls deposit of further feed onto said shelf, said mounting means including means for manually adjusting the vertical distance from the lowermost edge to the surface and being arranged to maintain said lowermost edge fixed against animal actuated movement, whereby deposited feed on the shelf remains on said shelf but can be removed to the trough by the animal, and means for dispensing water into the trough arranged such that it avoids dispensing water onto the shelf and including means actuable by the animal for controlling the dispensing wherein the shelf includes an edge nearest to said front edge of said trough which presents a V-shaped cross section around which the animal's mouth can engage to grasp feed on said shelf without encountering a raw edge of said shelf.

12. The invention according to claim 11 wherein the shelf is formed from sheet material with said V-shaped cross section defined by said horizontal surface and a flange turned inwardly and downwardly therefrom.

* * * * *